Oct. 24, 1933.     W. A. HOWARD     1,931,797
ORIFICE FITTING
Filed March 14, 1930     2 Sheets-Sheet 1

(SIDE ELEVATION)

(FACE ELEVATION)

(CROSS SECTION B-B)

WAYNE A. HOWARD
INVENTOR

ATTORNEY

Oct. 24, 1933.  W. A. HOWARD  1,931,797
ORIFICE FITTING
Filed March 14, 1930  2 Sheets-Sheet 2

(LONGITUDINAL SECTION)

(CROSS SECTION A-A)

(CROSS SECTION C-C)

WAYNE A. HOWARD
INVENTOR

ATTORNEY

Patented Oct. 24, 1933

1,931,797

UNITED STATES PATENT OFFICE 1,931,797

ORIFICE FITTING

Wayne A. Howard, South Gate, Calif.

Application March 14, 1930. Serial No. 435,822

5 Claims. (Cl. 137—75)

My invention pertains to the art of measuring the rate of flow of fluids by passing them through a calibrated orifice and reading the pressure differential between the two sides of the orifice.

The primary object of my invention is to provide a fitting into which plates bearing orifices of various sizes may be interchangeably inserted without interrupting the flow of fluid. Corollary objects of my invention are: to provide a fitting of smaller dimensions and less weight than similar fittings now in use; a fitting which can be manufactured at a reduced cost, which is free from the danger of leakage and the manipulation of which is simple and reliable.

Other objects and advantages of my invention will appear from an inspection of the attached drawings and the following description thereof, in which.

Figure 2:
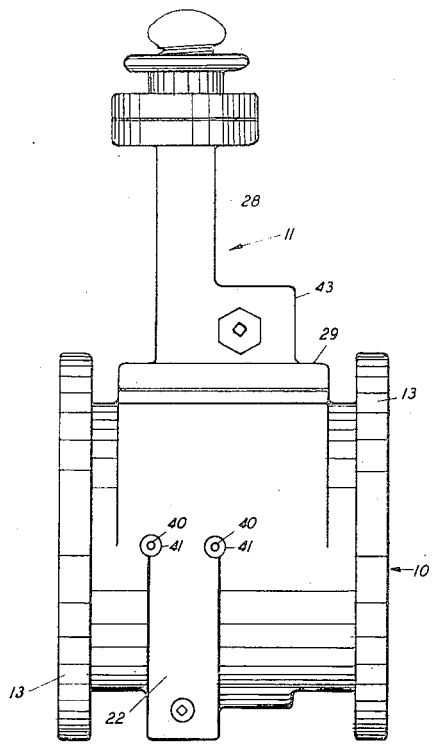
Fig. 2 is a left side elevation of the fitting.
Figure 1:
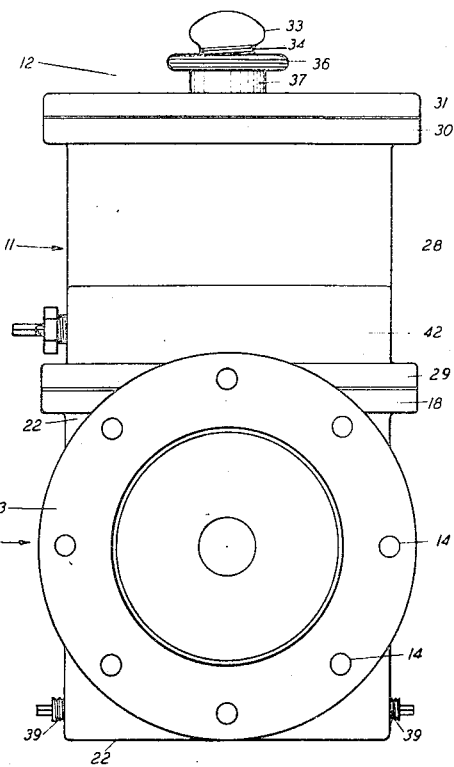
Fig. 1 is an end face elevation of a fitting embodying my invention.

Referring first to Figs. 1 and 2, the valve consists generally of a body 10, in which the orifice plate seats when in operating position and which has provision for withdrawing the plate and for closing the opening through which the plate has passed; a bonnet 11 in which the plate is retained during the process of removal and in which contained mechanism for closing the plate opening, and a cap plate assembly 12 containing means for drawing the plate into the bonnet and by removing which the plate may be completely withdrawn without either removing the bonnet or interfering with the continuous flow of liquid through the body of the valve.

Figure 6:
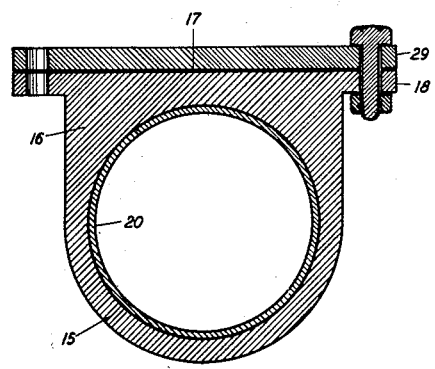
Fig. 6 is a cross section of the fitting on the line C—C of Fig. 3.

Referring to all the drawings, the body is provided with flanges 13 having bolt holes 14 for inserting the valve into a pipe line in the usual manner. The lower half of the body is semicircular in outline, as best indicated at 15 in Fig. 6, while the upper half is squared up as 16, faced on its upper surface as at 17 and provided with side flanges as at 18 for attachment of the bonnet.

The left end of the valve (in the position shown in Fig. 3) is bored out to the desired pipe size as indicated at 19 in the same figure. The right end is bored to a somewhat larger diameter and provided with a liner 20 which is firmly driven or pressed into a slightly larger ring 21 having the same internal diameter. The object in using the separable ring 21 is to permit a larger rotating ring to be assembled through the opening left on removal of the bonnet, as will be later described. Once assembled the liner 20 and the ring 21 function as an integral liner. The same object may be attained by making liner 20 and ring 21 in one piece having the outer diameter of ring 21.

The central portion of the valve is formed in a rectangular section 22 having an interior slot formed by the opposition of face 55 and the end 27 of ring 21. The interior of the bonnet registers with and is in effect an upward continuation of this slot. This slot receives the raised and faced edges 24 of the orifice plate 25, in the center of which is formed the orifice 26. This slot being carried around the interior of the bore, when the plate is in the operative position shown in Figs. 3 and 4 its raised faces are in nonleaking contact with one wall of the circumferential slot and with the inner end 27 of the ring 21. The fluid passing through the fitting is thus forced to travel through the orifice and cannot pass over the edge of the plate.

Figure 4:
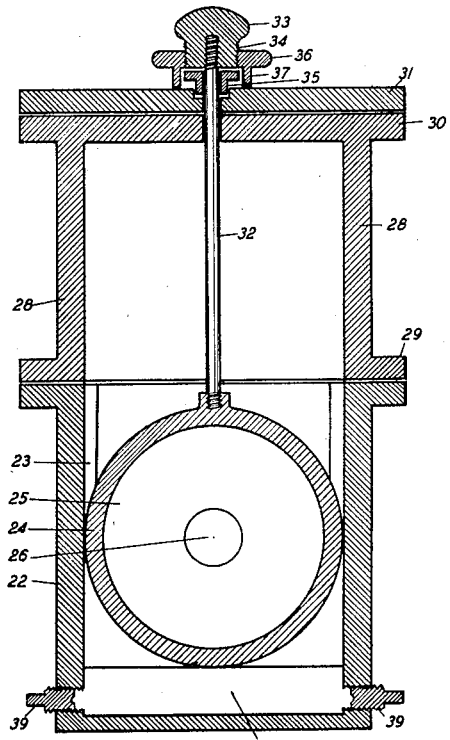
Fig. 4 is a cross section of the fitting on the line A—A of Fig. 3.

The right side 28 of the bonnet, shown in side elevation in Fig. 2 and in cross section in Fig. 4, is merely a continuation of the slot in which the orifice plate rests, and forms a relatively wide and thin chamber of sufficient height to receive the entire orifice plate. The bonnet is preferably bolted to the body of the valve, having flanges 29 for this purpose, and the upper end is flanged as at 30 for attachment of the cap plate 31.

To the top of the orifice plate is firmly but removably attached a pull rod 32 for raising and lowering the plate. This rod terminates in a knob 33 which is threaded outside as at 34. The rod passes through a stuffing box 35 located in the center of the cap plate, and which should be filled with soft packing. On the threaded portion of the knob or on the upper portion of the rod itself is placed a hand wheel 36 having on its lower side a projecting flange 37 surrounding the stuffing box gland and of sufficient height to allow adjustment of the gland. The lower edge of this flange bears rotatably on the top of the cap plate, and by holding the knob in fixed position and turning the hand wheel left hand considerable lifting force may be exerted on the orifice plate to dislodge it from its seat in case it should be frozen thereto. A simple lifting movement of the knob will then raise the plate to a position entirely within the bonnet and free from the body of the valve. The knob and hand wheel indicated may be replaced by similar metallic members adapted to be actuated by wrenches.

Figure 3:
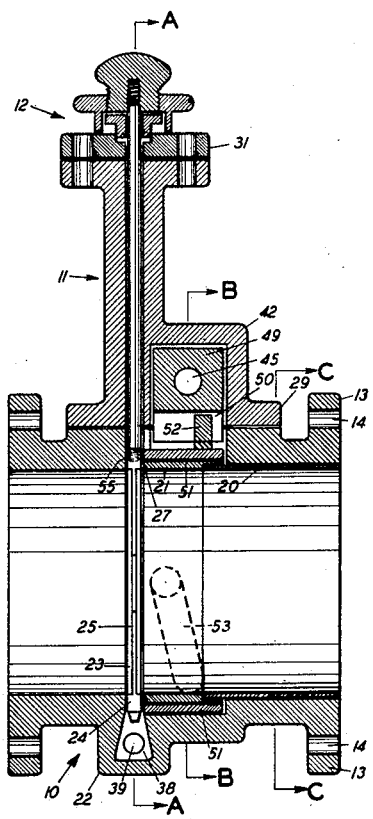
Fig. 3 is a longitudinal vertical section of the fitting.

The bottom of this portion of the valve body may desirably be formed into a flaring channel or pocket, indicated at 38 in Figs. 3 and 4, for receiving dirt or scale which may be dislodged from the plate or seat in removing the plate. This dirt may be removed by withdrawing the screw plugs 39, as the pocket is sealed off from the valve channel when the plate is in operating position in the slot.

In the metal of the valve body are formed two small threaded openings 40 surrounded by bosses 41, for the attachment of manometer or differential gauge connections. These openings are preferably so located that the center of each is say 1" from the center of the orifice plate in a longitudinal direction.

At the lower right side of the bonnet is formed a rectangular chamber 43 having one end closed and the opposite end stopped by a plug 44 which may be either pressed or threaded in place. A long screw 45 is placed within this chamber, the inner end being reduced in diameter and seated in the wall of the chamber as at 46 in Fig. 5 while the outer end passes through the plug 44 and through a stuffing box 47 formed therein. The outer end of the long screw should be squared for a wrench as at 48 or otherwise provided with means for revolving it.

On the long screw is mounted a travelling nut 49 which is prevented from revolving by contact with the side walls of the chamber and which therefore travels from end to end of the chamber as the screw is appropriately revolved. In the lower portion of this nut is formed a slot 50 parallel to the axis of the body and preferably tapering inwardly at the bottom as indicated in Fig. 5.

Figure 5:
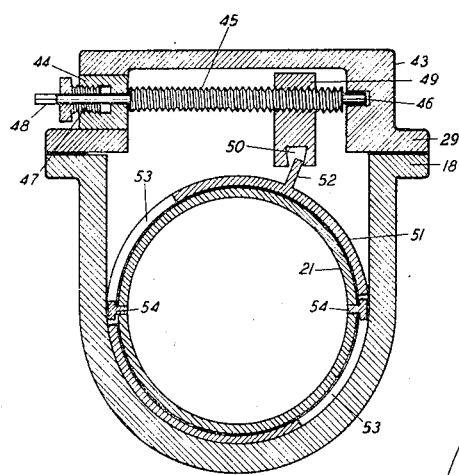
Fig. 5 is a cross section of the fitting on the line B—B of Fig. 3.

Referring to Figs. 3 and 5, the fixed ring 21 is surrounded by a slip ring 51 which should be carefully fitted so that it may easily be revolved on the fixed ring without material leakage between the two. This ring is provided with a rigid stud 52 adapted to fit into the slot 50 in the travelling nut 49. By this arrangement the ring 51 is caused to revolve for any desired distance by rotating the long screw 45.

The ring 51 is provided with slots 53, these slots having parallel sides and being of such width as to fit the heads of studs 54 which are firmly set in the fixed ring 21, or which may be fixed in the body if preferred. These slots, as indicated at 53 in Fig. 3, are eccentric to a plane at right angles to the axis of the body, this eccentricity being such that when the ring 51 is so revolved as to bring the studs 54 from one end of the slot to the other the ring 51 will be moved to the left a distance at least equal to the thickness of the orifice plate.

It will be seen that when the plate is in operating position the ring 51 must be turned to the position shown, in which it is fully retracted and its inner end is flush with or back of the end 27 of ring 21. On the complete withdrawal of the plate into the bonnet, as above described, the ring may be revolved and thereby moved to the left until its end contacts with the opposite face 55 formed in the valve body, thus forming an unimpeded channel for fluids through the body, which channel is sealed away from the bonnet. By removing the cap plate 31 the orifice plate may now be withdrawn from the bonnet and removed from the pull rod 32, and an unworn plate or one having a more suitable opening may be substituted and replaced in operative position by a reversal of the above movements.

The type of valve above shown has numerous advantages over the orifice plate fittings heretofore proposed. Most of these are evident from the above description, but I would call particular attention to the following points of advantage:

(1) The plate is vertically centered by merely shoving down the knob 33 as far as it will go, the hand-wheel having first been placed in the proper position on the knob and this position marked. If the plate should rise from this position by reason of vibration or other disturbing factor, the fact will be immediately evident as the flange 37 will then be clear of the cap plate instead of in contact with it.

(2) For any given pipe diameter this fitting is exceptionally small, particularly as to overall height, and because of its simplicity is relatively cheap and easy to build.

(3) Plates may be changed without stopping the flow through the pipe and without any danger whatever of leakage of inflammable liquids or gases while the change is being made.

(4) Plate changes and any desired repairs to the bonnet may be made without removing the fitting from the line.

(5) Any preferred type and shape of orifice plate may be used, making possible the use of standard plates, and as each orifice is in a separate plate only a small and inexpensive portion need be discarded when a single orifice becomes worn.

(6) While it is desirable to have all plates of substantially the same edge thickness, plates thinner than the standard may be used by advancing the revolving ring 51 into contact with the plate while the latter is in operative position.

(7) As it is never necessary to unscrew the pull rod from the plate while the latter is within the valve there is no danger of plates being "lost" in the fitting, which in other types often requires the entire removal of the fitting from the line.

(8) As no operating part of the fitting is below the top of the pipe the fitting may be backfilled along with the line and need not be housed except over its top.

(9) The fitting is gas tight as there are no unpacked adjusting rods or screws projecting through the case.

(10) The orifice plate seat is automatically wiped clean every time a plate is withdrawn, thus permitting the ready and nonleaking insertion of the substitute plate.

(11) In case a future requirement for an orifice plate fitting is foreseen at the time a pipe line is installed while the actual necessity has not yet arisen, the body portion only may be flanged into the line and the flat upper face closed with a simple bolt plate, permitting the superstructure to be added at any later time without removal of the fitting from the line.

I claim as my invention:

1. An orifice plate fitting comprising: a body adapted to the flow of a fluid therethrough; means within said body for retaining an orifice plate in position across the line of said flow; a single orifice plate in said means; a bonnet attached to said body and adapted to receive said orifice plate when said plate is withdrawn from said body through a slot formed in said body; means within said body for closing said slot, thereby sealing said bonnet away from said body while permitting uninterrupted flow of fluid through the entire diameter of said body; means for loosening said orifice plate from its seat within the said body; means for drawing said plate from said body into said bonnet, said means being also capable of indicating the proper seating of the orifice plate, means for withdrawing said plate from said bonnet while said bonnet is sealed away from said body and means connected with the orifice plate whereby the orifice plate seat is wiped clean every time said plate is withdrawn into the bonnet; all parts for operating the fitting being above the top of the pipe upon which it is to be used.

2. An orifice plate fitting substantially as described in claim 1; said bonnet being so formed as to be readily detachable from said body and so positioned, when tightly attached to said body, to cooperate with the orifice plate withdrawal means to indicate the proper or improper seating of the said orifice plate in the body of said fitting.

3. An orifice plate fitting which comprises: a body, two opposing fixed seats in said body, said seats being adapted to nonleakably retain an orifice plate and one of said seats being in the form of an axially projecting ring; an unthreaded slip ring surrounding said projecting ring and adapted to form a nonleaking joint with the opposite of said seats when said plate is withdrawn from between said seats, and means for positively actuating said slip ring into contact with said opposite seat.

4. An orifice plate fitting which comprises: a body, two opposing fixed seats in said body, said seats being adapted to nonleakably retain orifice plates and one of said seats being in the form of an axially projecting ring; an unthreaded slip ring surrounding said projecting ring and adapted to form a nonleaking joint with the opposite of said seats when said plate is withdrawn from between said seats, and means for positively actuating said slip ring into contact with said opposite seat, last said means comprising; eccentric circumferential slots formed in said ring, said slots engaging fixed studs; a projection from one side of said slip ring, and means cooperating with said projection for rotating said ring and thereby causing it to move longitudinally over said projecting ring by reason of the eccentricity of said slots.

5. An orifice plate fitting comprising: means for drawing an orifice plate from the body of said fitting into the bonnet thereof, said means comprising: a rod attached to said plate; a cap-plate covering the upper end of said bonnet; a stuffing-box formed in said plate and surrounding said rod; a handhold at the upper end of said rod above said cap-plate; an inverted cup surrounding said stuffing box and having its lower edge bearing on said cap-plate, said cup having screw threads cooperating with screw threads on said rod, and means for revolving said cup and for preventing said rod from revolving, thereby forcibly lifting said orifice plate from its seat.

WAYNE A. HOWARD.